(12) United States Patent
Morton

(10) Patent No.: US 10,026,007 B1
(45) Date of Patent: Jul. 17, 2018

(54) VIDEO SURVEILLANCE CAMERA SYSTEM WITH INTEGRATED TIME-LAPSE VIDEOS WITH MULTIPLE LEVELS OF TEMPORAL DETAIL

(71) Applicant: Steven Gregory Morton, Oxford, CT (US)

(72) Inventor: Steven Gregory Morton, Oxford, CT (US)

( * ) Notice: Subject to any disclaimer, the term of this patent is extended or adjusted under 35 U.S.C. 154(b) by 0 days.

(21) Appl. No.: 15/597,562

(22) Filed: May 17, 2017

(51) Int. Cl.
| | |
|---|---|
| G06T 7/38 | (2017.01) |
| G06K 9/52 | (2006.01) |
| G06T 7/223 | (2017.01) |
| G08B 13/196 | (2006.01) |
| H04N 5/915 | (2006.01) |
| H04N 5/91 | (2006.01) |
| G06K 9/36 | (2006.01) |

(52) U.S. Cl.
CPC .............. *G06K 9/527* (2013.01); *G06T 7/223* (2017.01); *G06T 7/38* (2017.01); *G08B 13/19639* (2013.01); *H04N 5/91* (2013.01); *H04N 5/915* (2013.01); *G06K 2009/366* (2013.01); *G06T 2207/30232* (2013.01)

(58) Field of Classification Search
None
See application file for complete search history.

(56) References Cited

U.S. PATENT DOCUMENTS

| | | | |
|---|---|---|---|
| 2016/0088326 A1* | 3/2016 | Solomon | H04N 21/254 725/12 |
| 2016/0295129 A1* | 10/2016 | Deshpande | H04N 5/2621 |
| 2016/0343402 A1* | 11/2016 | Singhal | G11B 27/005 |

* cited by examiner

*Primary Examiner* — Eileen M Adams

(57) ABSTRACT

A method provides for greatly reducing the time required for humans and machines to review long periods of recorded surveillance video, obtain images with high spatial and temporal detail, and greatly reduce the amount of data required for review. An Internet-accessible camera continuously captures video and records it internally in one or more series of short "normal" files. Each series of normal files has a particular resolution and frame rate. Periodically, a time-lapse video is also created within the camera, from images from a number of most-recent files in a given series of normal files. A user interface enables viewing a sequence of time-lapse videos, pausing playback, and clicking over to a normal video file it was made from, to view images with greater temporal detail, and back again. The method includes multiple resolutions of normal files and multiple series of time-lapse videos with different durations and sample rates.

18 Claims, 12 Drawing Sheets

VIDEO SURVEILLANCE CAMERA SYSTEM WITH INTEGRATED TIME-LAPSE VIDEOS WITH MULTIPLE LEVELS OF TEMPORAL DETAIL

CROSS-REFERENCE TO RELATED APPLICATION

This patent application claims the benefit of the provisional patent application, "Video Surveillance Camera System with Integrated Timelapse Video," filed May 20, 2016, EFS ID: 25842890, Application No. 62/339,495, Confirmation Number: 2897, by the inventor named herein. Note that sometimes I do not hyphenate time-lapse, as in the earlier title.

BACKGROUND OF THE INVENTION

Field of the Invention

This invention relates generally to video surveillance systems, systems that display video at high speed, and systems that create time-lapse videos.

Overview

Physical security and the reviewing of recorded video surveillance looking for someone or something in the past is a daunting task because so much time and data are required. This invention provides a method for reducing this time and data 100-fold, even allowing for download times when surveillance cameras are outdoors and only accessible via a relatively low speed, 3G cellular network, or a wireless network that is expensive to use. While cellular and satellite wireless networks are getting faster, they are slow compared to wired and optical networks, and the movement of a lot of data can be expensive. This invention recognizes that the video surveillance industry has focused on monitoring rapid movement, such as the shuffling of playing cards or vehicles traveling on a highway, whereas video surveillance for physical security often involves events that occur more slowly, such as a person walking by, the drop off or removal of an item, or changes in a landscape or building.

Review of the Prior Art

The use of time-lapse video to show the opening of a flower, or the progression of a construction site, is well known. In outdoor applications, snapshots are taken periodically, often 30 minutes apart, a long interval that is suitable only for detecting changes that persist, uploaded to a distant server, and, when a sufficient number of snapshots has been obtained, the server converts them into a time-lapse video. Software such as ffmpeg can perform such conversion.

Sensera Systems makes the model MC-30 and MC-60 outdoor cameras that, in addition to providing live video and a small amount of internal video recording, can take snapshots periodically and upload them to a server for conversion by the server to a time-lapse video.

This approach is useless for physical security because snapshots are much too far apart in time to capture the activity of humans and movement of objects, and the lack of integration with "normal" recorded video that provides high temporal and spatial detail, and the clearest images. It is cumbersome due to the need for external processing equipment and software, and the need for a means to access the time-lapse video. It can be expensive due to the bandwidth required to constantly send images to that external processing equipment. Were the interval between snapshots, the sample period, for such a system decreased from 30 minutes to 15 seconds to improve the temporal resolution of the time-lapse video to capture faster changes in scenes, the amount of data that must be transferred from an outdoor camera to a distant server via a cellular network would explode 120-fold, as would the processing requirements for turning a series of snapshots into a time-lapse video. Since image compression is inherently lossy, image clarity would be lost due to the need to re-compress the series of decompressed snapshots into a time-lapse video. In addition, there's no facility for coupling even the improved time-lapse video with normal recorded video to provide the greater spatial and temporal detail, and clearest images.

Truelook, Inc., sells video systems it claims combine live-camera viewing, time-lapsing and security recording. However, their systems provide only motion-triggered video recording and provide create customized time-lapse videos, spanning user-specified particular times. There is no provision for creating an endless series of time-lapse videos, each with the same length, viewing them seamlessly, one after another, at high speed, pausing playback when the viewer sees something of interest, and easily viewing the high quality, normal recorded video for more spatial and temporal detail, from the same point in time.

BRIEF SUMMARY OF THE INVENTION

Object of the Invention

The object of this invention is to provide a method for greatly reducing the amount of time required for humans and machines to review recorded surveillance video, particularly for use in physical security, and greatly reduce the amount of data that must be communicated to facilitate review of long periods of video. A further object is that rapid review of recorded video be virtually effortless, and that access to normal video, which has been recorded with high spatial and temporal detail, be integrated with time-lapse video that can be viewed at very high speed and minimal bandwidth over wireless networks. It is also an object that multiple series of normal video files and time-lapse video files be created simultaneously with different resolutions, frame rates and durations, and that viewers be able to quickly and easily move among them, from a point in time with lesser detail to that same point in time but with greater detail, viewing frames from different video files from the same point in time, to further expedite this rapid review by drilling down from less spatial and temporal detail to more detail, and back again to resume viewing lesser detailed images most quickly. It is also an object that creation and storage of all video be accomplished automatically, periodically and frequently, wholly within a wireless outdoor camera that communicates via a relatively slow, wide area wireless network. It is a further object that common video cameras and external video processing means may be used when the capability described in this paragraph is not present in cameras or cannot be placed in them.

BRIEF DESCRIPTION OF THE PREFERRED EMBODIMENT

I refer to a "Smart Camera" as a video surveillance camera that provides "normal" video and may also provide time-lapse video as described herein. I use "normal" video to refer to video with high spatial and temporal detail and clarity that one expects from a video surveillance camera or recorder, as opposed to "time-lapse" video that is made from a series of snapshots with relatively long time periods between snapshots, and whose images are inherently less clear, due to the use of lossy video compression, than the video from which the time-lapse video was made.

In the preferred embodiment, a video surveillance system consists of one or more Smart Cameras that communicate with the Internet, a Cloud-based Portal on the Internet, and one or more users whose computers can access the Portal and in turn, the Smart Cameras, via the Internet. Each Smart Camera has a processor, a mass storage system, the means for executing programs, and a means, such as a cellular modem, for communicating with the Internet. Users access one or more Smart Cameras via the Portal. The Portal has a web server that has web pages that dynamically provide a user interface and functions for accessing information from, and controlling, the Smart Cameras. Smart Cameras can differ from one to another such as by having processors with differing performance and amounts of memory, and differing optical and mechanical properties. The Portal stores information about each Smart Camera, including information about billing and which functions are available to each user and Smart Camera. This information controls the user interface and access to each Smart Camera. The Portal also provides a VPN host, such as OpenVPN, so that Smart Cameras can communicate with the Portal via the VPN and tunnel through firewalls, including those in their own modem and in the wide area network a Smart Camera uses to connect to the Internet. The Portal provides an IP-address translation function, between public and private IP addresses, so that users can access Smart Cameras without having to run a VPN client.

In an alternate embodiment, the functions of the Portal can be included within a Smart Camera.

In the preferred embodiment, each Smart Camera performs at least the functions commonly associated with a video surveillance camera. In addition, the Smart Camera continuously internally records normal video with high spatial and temporal detail, and retains it for days, weeks or longer, before replacing the oldest video by new video. The normal video is stored in a series of video files, each having a short duration that expedites remote access and the obtaining of a snapshot from the beginning of it.

In addition, periodically and automatically, at the start of each hour, the Smart Camera reads a series of normal video files it recorded internally during the previous hour, samples them periodically by taking an evenly spaced series of snapshots from them, using just the first frame from each selected file, converts the series of snapshots into a time-lapse video for that previous hour, and stores the time-lapse video for later access, all within the Smart Camera. I call this a time-lapse hour file. The file name for each time-lapse video file is unique and includes information describing its contents and required to view it properly. Similar capability for longer time periods, e.g., a day and a week, and with increasingly more time between samples, or snapshots, can also be provided, depending upon, for example, the performance of the processor. I call these time-lapse day files and time-lapse week files, respectively. Placing this capability within the Smart Camera avoids the need for the Smart Camera to periodically create and transmit images to a distant server, with the attendant data transmission requirements, to store the images and create time-lapse video from them.

In the preferred embodiment, a graphical user interface, whose files are stored on the Portal as a web site, enables the user to use a web browser to obtain and immediately view live video, normal recorded video, and time-lapse video, download blocks of normal recorded video and time-lapse video for viewing later, or archiving, control the Smart Camera and obtain status information about it. There are two types of downloads, one for viewing video immediately, which I call viewing recorded video in real time, via the graphical user interface, and the other for archiving blocks of video files and viewing the video later in a standalone media player such as QuickTime or VLC Media Player.

It is not possible for mobile devices and consumer-grade desk top computers to decode and display every frame of normal recorded video at very high speed, e.g., 60×, due to the high data rates and processing power required. The strength of time-lapse video is a long period of time can be seen quickly, with little data and little video decoding power because many video frames from the original video have been removed. However, it comes at the expense of the loss of temporal detail because those many frames have been removed, and the loss of image clarity compared to the original images due to the unavoidable use of lossy video compression in the creation of the time-lapse video.

My invention described herein solves these problems as follows.

Using a web browser, a user of my viewing page can immediately view, for example, one of my time-lapse hour videos, i.e., view images from it, or seamlessly view a series of them, at much faster than normal speed, e.g., at 120× wall clock speed. In other words, images captured by a Smart Camera over one hour can be viewed in 30 seconds. The user can, upon spotting an event of interest, pause playback of the time-lapse video and, with minimal effort, quickly view the normal recorded video from which the time-lapse video was formed, starting from the paused point in time or a little before, with much greater temporal and spatial detail than provided by the time-lapse video. The user can reverse the process to resume viewing time-lapse video from the point in time where s/he left off. A machine capable of interpreting images and sending commands to my web pages can be used in place of a human user.

As a further time-saving feature, the user can, depending on the persistence of the event s/he is looking for, start by viewing a time-lapse day file, which has less temporal detail than my time-lapse hour files because snapshots are further apart, pause it, back up the time a little, view the time-lapse hour file from the paused point in time, pause it, back up the time a little, and then view the normal recorded video, starting from the latter paused point in time. And then easily return to the point in time where s/he paused the time-lapse day file or time-lapse hour file to resume viewing at high speed.

To save the user time and bandwidth, and most quickly home in on a desired event, my invention provides the same process for first viewing my time-lapse week files, then time-lapse day-files, then time-lapse hour files, then normal files, and back again.

In addition, to speed up the process of reviewing recorded video even further, especially over slow networks, the preferred embodiment continuously and simultaneously creates not one but two sets of normal recorded video files. I refer to these as the low stream, low rate, or low resolution, video, and the high stream, high rate, or high resolution, video. The low stream, for example, has 960×540 resolution and 5 frames per second (fps). The high stream, for example, has higher resolution, 1920×1080, and also 5 fps. With a 4:1 difference in resolution, and the same compression factor, there is a 4:1 difference in file sizes and thus a 4:1 difference in the amount of time required to fetch like-duration normal video files.

To most quickly find the exact moment when an event occurred, the preferred embodiment enables one to pause immediate viewing of time-lapse recorded video in my graphical user interface, back the time up a little since snapshots forming the time-lapse recorded video are seconds or minutes apart, click over to, i.e., select, the low stream normal recorded video at the paused point in time, and then view the low stream normal recorded video at a few times faster than normal speed to determine the exact time when an event occurred. This provides high temporal detail but not the highest spatial detail. One can then pause video playback, back the time up a little, and click over to viewing the high stream normal recorded video from the paused point in time to obtain the highest spatial and temporal detail. In addition, the greatest image clarity is obtained since the original images are viewed, not time-lapse video derived from it.

This is "integrated" time-lapse video according to my invention. This is the integration of the creation and viewing of time-lapse recorded video with the creation and viewing of normal recorded video. It enables a user or machine to quickly visually spot an event using one or more sequences of my time-lapse videos and view it with the best spatial and temporal details needed for law enforcement, using one or more sequences of my normal recorded videos, with minimum data transfer, i.e., at minimal bandwidth. This is done while my Smart Camera is still in service in the field and doing all the functions associated with a surveillance camera, using common desk top computers and mobile devices for viewing.

I perform the recording of normal video files in my Smart Camera in a manner that minimizes the amount of computation power required to form time-lapse videos from them. This enables low performance processors that have few computing resources and consume little power, for use with battery or solar power, to be used while still providing all the functions associated with a video surveillance camera.

Since the meaning of playback speed of a time-lapse video is ambiguous, I use the phrase "wall clock speed" so that my standard for viewing speed is independent of video frame periods. To do this, in the preferred embodiment, the time between successive images is included in the name of the time-lapse video file and used to control how many frames per second are displayed by the media player used to display video in my viewing page. This media player is natively provided in HTML5 for H.264/MP4 files, which are used by my Smart Cameras in the preferred embodiment. Wall clock speed is based simply on how long video that was acquired over one minute takes to play. When I make a time-lapse video from a series of snapshots captured by a Smart Camera over an hour, I call the time-lapse video an hour file. When that time-lapse file plays in one minute, the wall clock speed is 60× regardless of how many snapshots were used or the time between snapshots. Likewise, the playback of an one-hour time-lapse video in only 30 seconds is at 120× wall clock speed. This timing information cannot be embedded within, for example, a MP4 container for an H.264 video stream because the container cannot capture two required pieces of information, namely, the time between the acquisition of snapshots and the time to wait between the display of successive frames, i.e., snapshots.

In an alternate embodiment, common IP cameras whose endless video stream is broken into segments and stored in a series of video files on a video recorder, may be used with an external server that converts the recorded video into time-lapse video, with the normal and time-lapse recorded video being accessed in an integrated fashion according to this invention.

BRIEF DESCRIPTION OF THE DRAWINGS

Note: For the reader's convenience, items in illustrations are numbered according to the first figure they are shown in, rather than having reference numbers not keyed to figure numbers. For example, item number xyz is first shown in Figure x.

When I say "live video" or "recorded video" is shown, I mean a frame, which is the same as a snapshot, from such video is shown. When I say a "viewing page," I mean a web page as presented in a web browser such as Chrome on a Windows PC, that is accessible via a web server. The code for these pages is stored on my Portal for users of one or more of my cameras, which I call Smart Cameras, to use. There can be multiple such Portals.

DETAILED DESCRIPTION OF THE INVENTION

Figure 1:
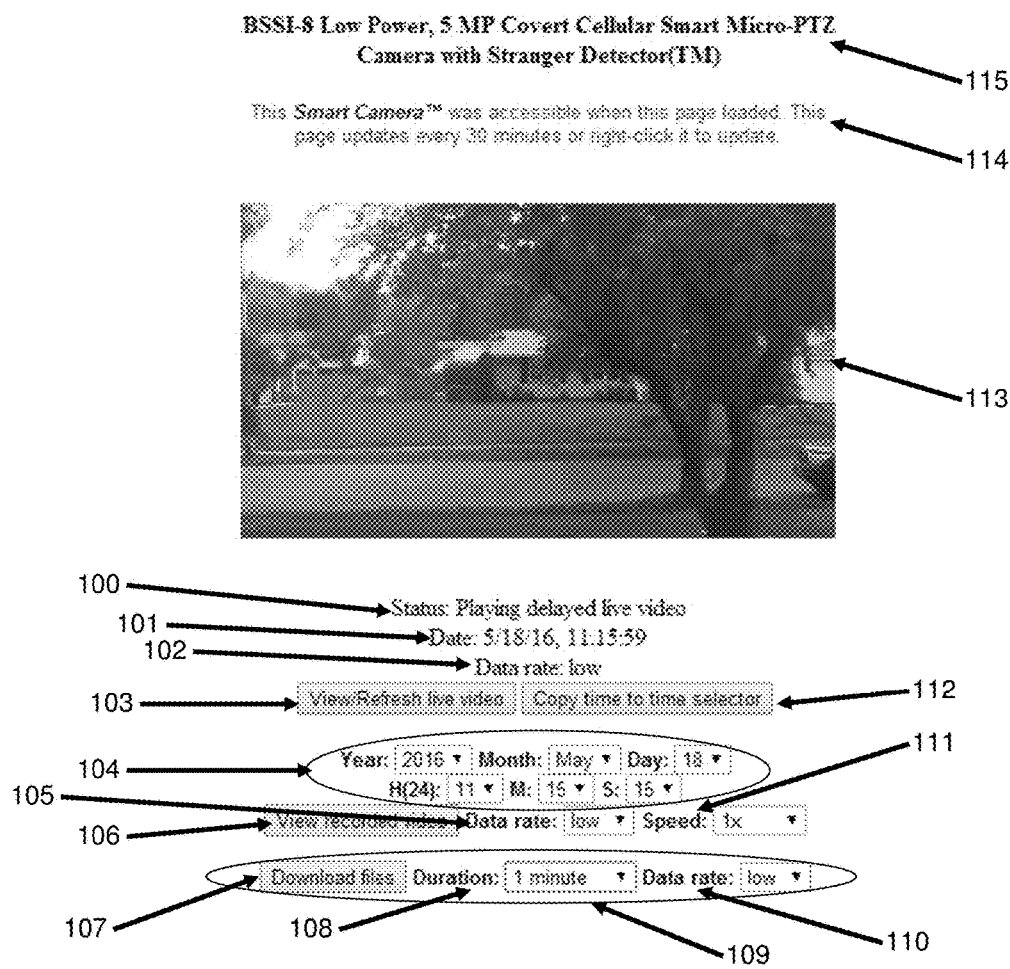
FIG. 1 shows a viewing page without my Integrated Time-Lapse capability, displaying live video. Key elements in the page are identified.

I call video that is recorded from a series of images, where the images are captured at multiple frames per second, normal recorded video. I call video that is created from a series of images, aka frames and snapshots, that were captured a number of seconds or minutes apart, time-lapse recorded video, or time-lapse video for short.

Here's how I describe a wireless outdoor video camera system according to my preferred embodiment to potential users, where the parameters specified are only examples and do not limit the application of my invention:

How often have you wanted to QUICKLY review a long period of recorded video to look for someone or something, to see when someone or something came or left, or see how something progressed? Wouldn't you like to view an hour's time in just thirty seconds over the air so you don't have to wait to retrieve a camera system and all its recorded video from the field? A day's time in one minute? A week's time in a few minutes? With sufficient temporal and spatial resolution, and high clarity, to see what you need to see?

My Integrated Time-Lapse Video software creates high definition, time-lapse video automatically and continually within my Smart Cameras. One no longer need spend hours reviewing recorded video to find an event. There's no need to tediously acquire, transmit and archive a series of images to a server or workstation, choose groups of images, convert them to time-lapse video, and make them available to others for viewing. In addition, my videos are automatically and continuously created hierarchically, with a series of time-lapse videos whose durations and temporal resolutions are tailored for different kinds of movement. And, rather than being time-lapse video clips with low frame rates and resolution that are detached from all other video, my time-lapse video is integrated with my normal recorded video for high spatial and temporal resolution, and the utmost clarity.

Here's the key idea: First, users should quantify how quickly whatever they are trying to see changes, and then quantify over what period of time they are looking for this activity. The first is an application of the Nyquist criterion to activity—one must visually sample, i.e., snapshot, the desired activity often enough to capture it. For example, if the user is looking for any person to walk across a field of view, and it takes the person 20 seconds to do so, but a time-lapse video that only captures one snapshot every minute has only a 33% chance of capturing an image of the person. But if the time-lapse video captures a snapshot every 15 seconds, then two images of the person will be captured. The persistence of the person is 20 seconds and the sample period, 15 seconds, is less, so images will be captured. Similarly, if the user is looking to see when a package was delivered, and the package is removed 5 minutes later, then the package has a persistence of 5 minutes. A time-lapse video capturing images once per minute will capture 5 images of the package, but a time-lapse video capturing images only every 15 minutes will only have a 33% chance of seeing it.

Is the user looking for:

a) a person walking, or a passing vehicle that stops briefly, which requires a time-lapse video with the most frequent snapshots, e.g., every 15 seconds, and uses my continuous sequence of time-lapse hour files, each of which captures one hour of activity, b) when something was dropped off and stays for at least one minute, or is removed and stays removed for at least one minute, over the span of one to a few days, the event can be found most quickly and with the least data by first using my continuous sequence of time-lapse day files, which have medium frequency snapshots, e.g., every 60 seconds, and each file captures one day of activity, or c) when something was built or destroyed over the span of multiple days, the event can be found most quickly and with the least data by first using my continuous sequence of time-lapse week videos, which have the lowest frequency snapshots, e.g., every 15 minutes, and each file captures one week of activity.

Using my invention described herein, users can save time and wide area network bandwidth reviewing recorded video by following these steps:

Step 1) choose my sequence of time-lapse video files that has snapshots at an interval that is less than the persistence of the event sought, and view the time-lapse video starting from a time prior to the expected time of the event Step 2) when the user spots the desired event, or possible desired event, pause time-lapse video playback, copy the time to my time selector, and back up the time a little Step 3) click over to viewing my "low resolution," 960×540, normal recorded video, and, if desired, increase its playback speed, depending on the interval between snapshots in the time-lapse video, the longer the interval, the faster the speed Step 4) when the user spots the desired event, pause video playback, copy the time to the time selector, and back up the time a little Step 5) click over to viewing my "high resolution", 1920×1080, normal recorded video (within Smart Camera storage limits) for the most sharpness and temporal detail Step 6) if the user desires to resume viewing time-lapse video from where s/he left off, click back to viewing the time-lapse video and then go to step 2

I use these steps because my 960×540 normal recorded video can be viewed over the air at 4× the speed of my 1920×1080 recorded video thanks to the 1:4 difference in resolution and like amounts of compression. Since any time-lapse video is formed from snapshots a number of seconds or minutes apart, pausing playback of time-lapse video and using the time stamp of the paused video frame gives only the approximate time of an event and likely misses the event. Instead, in accordance with my invention, one can quickly home in on the exact time of an event by spotting an event in my time-lapse video, backing up the time of the time-lapse video a little, and viewing my 960×540 normal recorded video from that point in time. One then views my normal 960×540 recorded video at faster than normal speed over the air to quickly find the time of an event more precisely. One then pauses playback of my 960×540 video, backs up the time a little, and views my 1920×1080 normal recorded video from that point in time, but at lower speed, to identify the exact time of the event. I call this process, "drilling down." In addition, this process has the added advantage that one views the original, highest quality, video recordings, not lesser quality images made from them due to the unavoidable use of lossy compression in creating time-lapse video.

When my method described herein is implemented in software as described herein and runs on a Smart Camera described herein, the following time-lapse videos, in the universal H.264/MP4 video format, can all be created automatically, continuously and simultaneously within my Smart Camera. Time-lapse video files are retained at least as long as the normal recorded video files from which they were made. These time-lapse videos can be viewed easily via my usual Smart Camera viewing page that supports time-lapse video, and my Cloud-based Portal. All parameters, such as resolution, snapshot sample rate, and frequency of creation of any given series of time-lapse video, are examples. A series of time periods, using a series of same duration, time-lapse videos, can be viewed sequentially via the Portal, with playback speed chosen by the viewer:

1) every hour: 960×540 time-lapse video "hour file," created from one snapshot, or frame, every 15 seconds: It is ideal for spotting persons walking, and parked or stopping vehicles. It is automatically created for the previous hour with processing starting near the beginning of every hour. An hour is typically displayed in just 30 seconds over the air, including the time to download the file, providing an 120× speedup, even when using a relatively slow, 3G cellular network. It is intended for physical security, and, since it is created hourly, one can see activity earlier in the same day, or in previous days.

2) every day: 960×540 time-lapse video "day file," created from one snapshot every minute. It is automatically created for the previous day with processing starting near the beginning of every day. With 1,440 frames and a playback speed of 30 frames per second, a day can be viewed in 48 seconds over the air. It is intended for spotting long-lasting changes such as something that was dropped off or removed, and not restored or removed for at least 60 seconds.

3) every week: 960×540 time-lapse video "week file," created from one snapshot every 15 minutes. It is automatically created for the previous week with processing starting near the beginning of every week. It is intended for viewing progress at construction sites, and the presence of vandalism, arson, or illegal dumping.

A brief description of the programs, whose text of the shorter ones is included herein, that create these time-lapse videos according to my invention, follows. The text file that controls cron, a common scheduling program, is also included herein. These programs are shell programs which are written in bash and run under Linux, but many computer programming languages and operating systems could be used.

In the preferred embodiment, these programs run automatically under Raspian Linux on a system, which I call a Smart Camera, containing a readily available, Raspberry Pi processor board with a Raspberry Pi Camera. As is well known in the art, and thus not illustrated herein, a Raspberry Pi processor board executes programs, has a graphics processor chip, and has a mass storage system that stores programs and data. The graphics processor chip acquires raw images from a Raspberry Pi Camera, converts them into at least one H.264 video stream, and provides the stream to the processor in real time.

Time-lapse videos are continually and automatically created within my Smart Camera, according to this invention. The integration of these time-lapse videos with normal recorded video is provided by a web page, whose functionality in accordance with this invention is described herein, that runs on a portal with a web server, and is viewed in a web browser. The processor board communicates with the Internet via a network connection using a cell modem. All other Smart Camera functions continue without delay or interruption while time-lapse video is created because I create time-lapse video in the background at low priority.

In the preferred embodiment, the resolution of the primary video stream from the graphics processor is 1920× 1080. I configure the formation of the video stream so that key frames are inserted at least once every 5 seconds to facilitate breaking the stream into 15-second long segments, while minimizing data rates, and so that key frames usually occur at times of 0, 15, 30, or 45 seconds. In addition, I form a lesser resolution H.264 video stream within the graphics processor from the primary stream, with ½×½ resolution, i.e., 960×540 resolution. It contains the same key frames as the original stream, facilitating breaking it into 15-second long segments, too.

A video capture program uses Python picamera, a video processing program such as ffmpeg, or other program to segment each H.264 video stream at certain key frames, i.e., at nominally every third one, wrap each segment in a MP4 container, and store the result in an endless series of short, e.g., 15-second, MP4 video files within my Smart Camera in a hierarchical set of folders. In the mass storage system within the Smart Camera, I create a video folder, and under it, folders for low and high resolution video files separately. Under each of these folders are folders for years. Under each year folder are folders for months. Under each month folder are folders for days. Under each day folder are folders for hours. Under each hour folder are folders for minutes. Four, 15-second long normal video files are placed in each minute folder.

I periodically check the amount of space available for video files in the mass storage system. The oldest normal and time-lapse video files are erased when a desired amount of free space is not available to make space for new ones. To simplify storage management, folders containing one hour of normal recorded video are erased in their entirety, and folders for like time periods of the low and high resolution normal recorded video files are erased in tandem.

The additional functions that run within my Smart Camera in accordance with my invention are:

1) crontab_root.txt, see Program Listing 1

It is a control file I have written for cron, a Linux scheduling program, according to my invention. This control file chooses when to run three scheduling programs that control the creation of my hourly, daily and weekly time-lapse videos. Other durations can also be created. The scheduling programs run in the background. On a low performance processor, such as the Raspberry Pi B+, only the hourly and daily time-lapse videos are created, with the same resolution as my low resolution, normal video files, and with relatively long periods between snapshots from which the time-lapse videos are made. On faster processors, such as the Raspberry Pi Zero, and particularly those with more RAM, such as the Raspberry Pi Model 2 and 3, additional time-lapse videos may be created, and with higher resolution and/or more frequent snapshots.

2) timelapse_scheduler_hour.sh, see Program Listing 2

It is a shell program that I have written in Linux bash, according to this invention. When it is activated by cron, it starts running near the beginning of every hour to convert the previous hour's low resolution, normal recorded video into a time-lapse video, which I call an "hour file." The parameters shown cause timelapse.sh to run at a low priority in the background and sample the normal recorded video, low stream, every 15 seconds over a one-hour period. It passes parameters to timelapse.sh that specify the beginning date and time from which to start creating the time-lapse video, the time, or interval, between snapshots, the duration, i.e., 60 minutes, of the time-lapse video, and which stream, i.e., which set of normal video files to use, i.e., the low or high resolution ones, to create the time-lapse video.

The parameters are chosen so that processing an hour's video can be performed in less than an hour so that processing for one hour is finished before it is time to process the next hour. It is my preferred format for time-lapse video for physical security since it samples the recorded video the most often and, when properly configured and processing daylight video, which requires much more processing power than night video, runs in less than a half hour on a lightly loaded Raspberry Pi B+, in parallel with all the other Smart Camera functions. The run time is only a few minutes on a more powerful, Raspberry Pi Zero, Model 2 or Model 3, and enables shorter periods between snapshots to be used.

3) timelapse_scheduler_day.sh, see Program Listing 3

It is a shell program that I have written in Linux bash, according to this invention. When it is activated by cron, it starts running near the beginning of every day and causes timelapse.sh to run at a low priority in the background to convert the previous day's normal recorded video low stream into a time-lapse video, which I call the "day file." The parameters shown sample the normal recorded video, low stream, every 60 seconds over a 24-hour period. Run time can be several hours on a moderately loaded Raspberry Pi B+, or less than an hour on a more powerful model, in parallel with all the other Smart Camera functions.

4) timelapse_scheduler_week.sh, see Program Listing 4

It is a shell program that I have written in Linux bash, according to this invention. When it is activated by cron, it starts running near the beginning of every week and causes timelapse.sh to run at a low priority in the background to covert the previous week's normal recorded video into a time-lapse video, which I call a "week file." The parameters shown sample the normal recorded video, low stream, every 900 seconds=15 minutes over a 7-day period, in parallel with all the other Smart Camera functions.

5) timelapse.sh

It is a shell program that I have written in Linux bash, according to this invention. I do not include a program listing for it, due to its length, but I describe its functions in detail.

It is activated by my time-lapse schedulers and creates a time-lapse video from multiple normal recorded video files according to the parameters provided. Due to resource limitations, it only runs when no other instance is running. It partially decodes each of a series of previously recorded videos, using ffmpeg to turn the initial frame, which happens to be a key frame due to the nature of compressed video, from each specified video file into a jpg image. A blank image is used when a desired video file is not present, such as because the Smart Camera was not running at the snapshot time requested. Once normal recorded video files, starting from the specified starting time, for the duration specified, and with the specified time between snapshots, have been decoded as necessary and converted to jpg images over the selected time period, it uses a video processing program, such as ffmpeg, to convert the series of jpg's into an H.264/MP4 video file. In addition, headers are arranged for rapid streaming, and soft subtitles are created and inserted to periodically show the date and time that frames were captured. The format of the name of the file is described subsequently.

I say "decoded as necessary" because processing time, which is important on a low performance processor, is minimized by keeping the same resolution for the time-lapse video as the video files whose snapshots are used to create it, and by having short duration files so that only their initial frame need be decoded. Snapshots more frequent than the duration of a video file can be created, but at the expense of the time required to obtain the desired frame from a file.

Choosing proper parameters to minimize run time is important when a low performance processor is used. In a typical application that creates a time-lapse video file every hour, converting only the first frame from a series of normal recorded low stream video files to jpg's uses about 20% of the cpu time required to create the time-lapse video. The remaining 80% of the cpu time required to create the time-lapse video is spent compressing the series of jpg's into a H.264/MP4 file. This requires a total run time of 15 to 45 minutes—less than an hour—on a low performance, Raspberry Pi B+, depending on how many other tasks the cpu performs simultaneously, when daylight images are being processed. Night images, being dark in the absence of lighting, have less content, and are processed more quickly, so long as they aren't noisy.

In the preferred embodiment, this program assumes video has been captured and converted to a live, 1920×1080, H.264 video stream at 5 fps with low-Q, which means low compression for high sharpness. Key frames are inserted nominally every 5 (not 15) seconds. This is my baseline, or "0," high data rate, high resolution video stream. It is broken into nominally 15-second increments, each starting with a key frame, and stored as an endless series of H.264/MP4 video files, which I call normal recorded video, high stream, which has a relatively high data rate. The video files are stored in a hierarchical series of folders, with folders for each minute, hour, day, month, and year, all under the "0" folder in a file system in the Smart Camera reserved for video storage. In addition, the live, baseline video stream is scaled ½ by ½ to 960×540 at 5 fps, and compressed, also with a low-Q since its sharpness affects the sharpness of time-lapse videos made from it. This is the "1" or low data rate video stream. It, too, is broken into nominally 15-second increments, each starting with a key frame, and stored as an endless series of H.264/MP4 video files, which I call normal recorded video, low stream, with a low data rate, in a like set of folders, all under the "1" folder.

I name these normal video files as follows to describe their starting time and which stream they are; note the single and double underscores, which help my programs parse the name to obtain the starting date and time the file was created:

$HOSTNAME_<stream>_<start>.mp4

Where:
$HOSTNAME is the Linux host name of the Smart Camera
<stream> is 0, for the high data rate stream, 0 because it's created first, or 1, for the low data rate stream, which is derived from the high data rate stream
<start> is YY (2-digit year), MM (2-digit month), DD (2-digit day), "_", hh (2-digit hour, mm (2-digit month), ss (2-digit seconds), and ss is 00, 15, 30 or 45

An example file name is "BSSI-8_1_160518_111515.mp4". This file is displayed in FIG. 5.

Other video file formats, video resolutions, video file durations, folder organizations, naming conventions, and number of different video streams can be used.

Having video files with short durations, such as 15-seconds in the preferred embodiment, is particularly efficient when snapshots at least 15 seconds apart, or a multiple of 15 seconds apart, are used to create the time-lapse videos because only the first frame of the normal recorded video file need be decoded. It is not necessary to spend the time to search and decode into a video file to find subsequent frames for use in the time-lapse videos. This enables relatively low performance processors, and ones with limited RAM, to be used.

I name time-lapse video files as follows to describe the time period covered and include information, i.e., the interval between snapshots, required to display the proper wall clock speed; note the single and double underscores, which help my programs parse the name to obtain the date and time the file was created:

$HOSTNAME_<stream>_<from>_to_<to>_by_<interval>.mp4

Where:
  $HOSTNAME is the Linux host name of the Smart Camera
  <stream> is 0, for the high data rate stream, or 1, for the low data rate stream. A scheduling program specifies which normal recorded H.264/MP4 video files to read as input, and creates a time-lapse H.264/MP4 video file with the same resolution as the output.
  <from> is the starting time of the time-lapse video and has the form YYMMDDHHmmss, where YY=two-digit year, MM=two-digit month, DD=two-digit day, HH=two-digit hour, and mmss (minutes and seconds) is 0000
  <to> is the ending time of the time-lapse video, in the same format as <from> with mmss being 5959, hence for an hour file, YYMMDDHH is the same in <from> and <to>
  <interval> is the number of seconds between samples, aka snapshots, typically being 15 for an hour file. Thus a value of 15 reads one sample, the key frame, from every 15-second normal recorded video file. A value of 30 reads one sample, the key frame, from every second, 15-second normal recorded video files, and so on, with only the first frame from each file being required, minimizing decoding of the normal video file.

A calculation of the difference between the from-time and the to-time gives the wall-clock duration of the time-lapse file, e.g., hour, day or week, which could be other values.

Time-lapse hour files are placed in day folders with corresponding resolution. Time-lapse day and week files are placed in month folders with corresponding resolution.

As noted above, the use of video that has been recorded with two significantly different resolutions into 15-second video files greatly reduces processing requirements. First, my preferred resolution for hour-long time-lapse video is the lower resolution of two internally recorded high definition video streams. The lower the resolution, the less video must be decoded and converted to jpeg images, and the less complex are those many jpeg images that must be converted into a H.264/MP4 time-lapse video file using a time-consuming, software video encoder, e.g., ffmpeg. Second, since my preferred time-lapse sampling periods are 15 seconds for an hourly time-lapse video file, 60 seconds for a daily time-lapse video file, and 15 minutes for a weekly time-lapse video file, only a fraction of the many nominally 15-second long video files need be processed. This is far more efficient than decoding a long video file to obtain the samples required. Third, it greatly reduces the amount of processing time required to decode a video file and convert a frame from it into a jpeg image since only the initial frame, a key frame, in selected video files need be found and decoded. This enables the continual creation of hourly time-lapse video files on a lightly loaded, small, low performance processor such as the Raspberry Pi B+, while the processor performs all the many other tasks required to implement a high definition video surveillance camera.

Were one to periodically obtain periods of recorded video from a conventional video recorder, with its single, high resolution and long file periods, far more processing power would be required to create time-lapse videos. However, it would be a way to retrofit systems of IP cameras and network video recorders with time-lapse video to speed reviewing of recorded video. The viewing of such time-lapse video with normal recorded video should be integrated for ease of use as described herein.

A more efficient way to integrate time-lapse video with normal recorded video using IP cameras is for a server to acquire a series of still images from each IP camera, while it simultaneously acquires and stores high quality video from each camera, and create a series of non-overlapping time-lapse videos from non-overlapping groups of still images from each camera. A user interface according to this invention would be required to facilitate the convenient, integrated viewing of both time-lapse video and normal recorded video for each camera.

In another alternative embodiment, at least hourly time-lapse video files would be created incrementally so recent time-lapse video is available with less delay, instead of waiting a period of time into the following hour for it to be created.

A detailed description of the figures follows.

FIG. 1 shows the viewing page, the graphical user interface, for a particular Smart Camera, identified as BSSI-8 in the title block, 115, in this example, when Integrated Time-lapse capability according to this invention is not provided. A user chooses to access a particular Smart Camera by accessing a particular account on a particular Portal.

The online status of the Smart Camera is reported in the Smart Camera status block, 114. The Portal contains information for each Smart Camera that controls the presentation of web pages for that Smart Camera according to which functions are available for it, such as whether or not Integrated Time-lapse capability according to this invention is provided. The Portal also periodically monitors the online status of every Smart Camera it supports. The page shown was created in PHP and JavaScript, but can have any number of graphic designs and can be implemented using any programming language.

Video can be viewed delayed live or recorded. Normal video, when displayed at 1× speed, is shown one second for every one second at the time of capture; the reason for this specification will be evident later, where the meaning of speed is less obvious. In this example, which assumes real-life performance of relatively low speed, 3G cellular networks, live video is only available with the low data rate stream, while recorded video is available in both the low and high data rates. Viewing any recorded video in this web page may start and stop as successive video files are fetched from the Smart Camera over the air. In the preferred embodiment, the low data rate video has 960×540 resolution, 5 frames per second (fps), and a data rate in daylight compatible with most 3G cell networks for at least one viewer at a time. The high data rate video has 1920×1080 resolution, 5 fps, and a data rate in daylight higher than many 3G cell networks can provide even for a single viewer at a time. These figures are only examples since video resolutions, frame rates and data rates change as technology improves.

The video display "Status" field, 100, has a two-part value, including delayed live video, that describes the type of video chosen by the user for acquisition from the chosen Smart Camera and display in the video window, 113, and also the status, including for example, Playing, of this video. Other values of the Status field when time-lapse video is not provided for a given camera, include (a) Loading, (b) File not found, and (c) Playing recorded video, i.e., playing Normal recorded video.

Live video in this example is delayed somewhat from real time due to buffering, as explained in a subsequent paragraph. The video display "Date" field, 101, has a value, e.g., 5/18/16 11:15:59, that tells the date and time, which I call the time stamp, of the particular video frame being displayed, to the nearest second. The video display "Data rate" field, 102, has a value, e.g., low, that tells which video stream, e.g., the low data rate, lower resolution, 960×540 video stream, has been selected for display. I use "stream" to refer to either live video produced at a particular data rate, or video recorded at a particular data rate, low or high in this case.

The date and time to begin viewing live video is always "now" as measured in the time zone of the Smart Camera. The date and time to begin viewing recorded video or downloading recorded video is chosen by the controls in the date and time selector, 104, which I call the time selector. The time stamp of the video frame being displayed can be copied into the time selector by clicking the Copy time to time selector button, 112. Using this button or the time selector and then clicking the View recorded video button, 106, one can quickly jump from viewing live video to reviewing the same or different point in time from recorded video.

Using the Data rate control, 105, and then the View recorded video button, 106, one can quickly change from viewing the low data rate recorded video to viewing the higher resolution, high data rate recorded video, from the same point in time. The Speed selector, 111, chooses the speed to display recorded video. Speed is always based on wall clock time and is context-sensitive based on the type of recorded video chosen, which, in FIG. 1, is always "normal" since there is no provision for anything else.

I distinguish the immediate viewing of recorded video in the web page shown as it is fetched from a Smart Camera, which is performed using the View recorded video button, 106, from fetching a block of video files from a Smart Camera and combining them into an archive, using the Download files button, 107, for viewing later in a standalone media player, such as QuickTime or VLC Media Player, or long term storage on the user's computer. The time selector, 104, is used in both cases to chose the starting date and time.

The Download files group of controls, 109, has one button and two selectors that control downloading normal recorded video files from a Smart Camera for use later. The duration of the files to be downloaded is chosen by the Duration selector, 108, whose values come from a list of time periods including, for example, one minute. The choice of low or high data rate, which is synonymous with low or high resolution, and the low or high stream, files to be downloaded is made by the Data rate selector, 110.

I describe live video as delayed live video because it is an endless series of short-duration H.264/MP4 video files, not an endless H.264 RTP (real time protocol) or other IP-data stream. The most recent file is selected automatically and displayed. This enables video with only a small delay from true-to-life to be displayed natively in a browser using HTML5 without requiring any plug-ins or special viewing software, avoiding cyber security risks of custom viewing software. This is most useful on PC's and other devices that do not require clicking a Play button for each video file. My Smart Camera provides a file that is constantly updated to give the time stamp of the most recently finished normal video files. The browser can fetch the most recent, completed normal video file using the time stamp within this file.

In the preferred embodiment, all normal video files are 15 seconds long, hence there is a delay of at least 15 seconds plus download time from true-to-life time. In addition, to reduce the delay, there are also transient, much shorter files, e.g., only a fraction of a second long, which are only retained briefly in temporary storage in the Smart Camera, rather than being stored in the mass storage system, aka on disk, in the Smart Camera, and a pointer to the most recent. To minimize storage and communications requirements, all of my video files that have many frames, since it is possible to have H.264/MP4 files with only one frame, have a key frame at least every 5 seconds.

Figure 2:
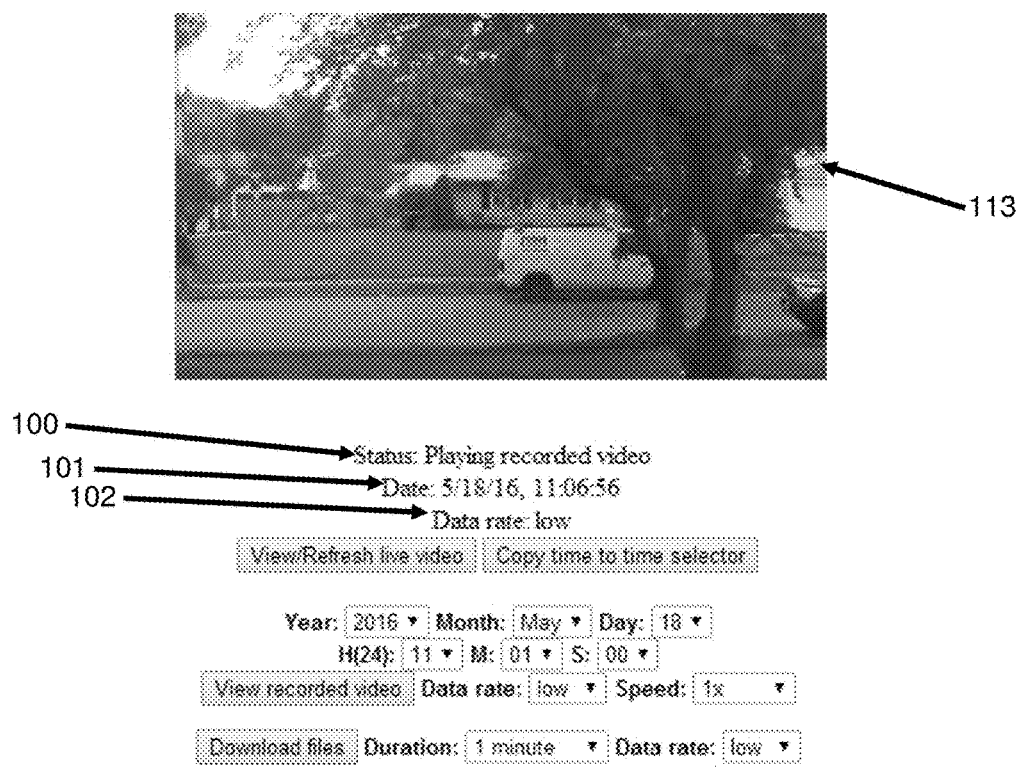
FIG. 2 shows a viewing page without my Integrated Time-Lapse capability, displaying normal recorded video at a low data rate at normal, i.e., 1×, wall clock speed.

FIG. 2 shows normal recorded video being displayed on a Smart Camera viewing page when Integrated Time-lapse capability according to this invention is not provided. The display of normal recorded video is indicated by Status: Playing recorded video, 100. The time stamp of the frame being displayed in the video window, 113, is given by Date, 101. The resolution and data rate of the recorded video stream chosen is shown by Data rate, 102.

Figure 3:
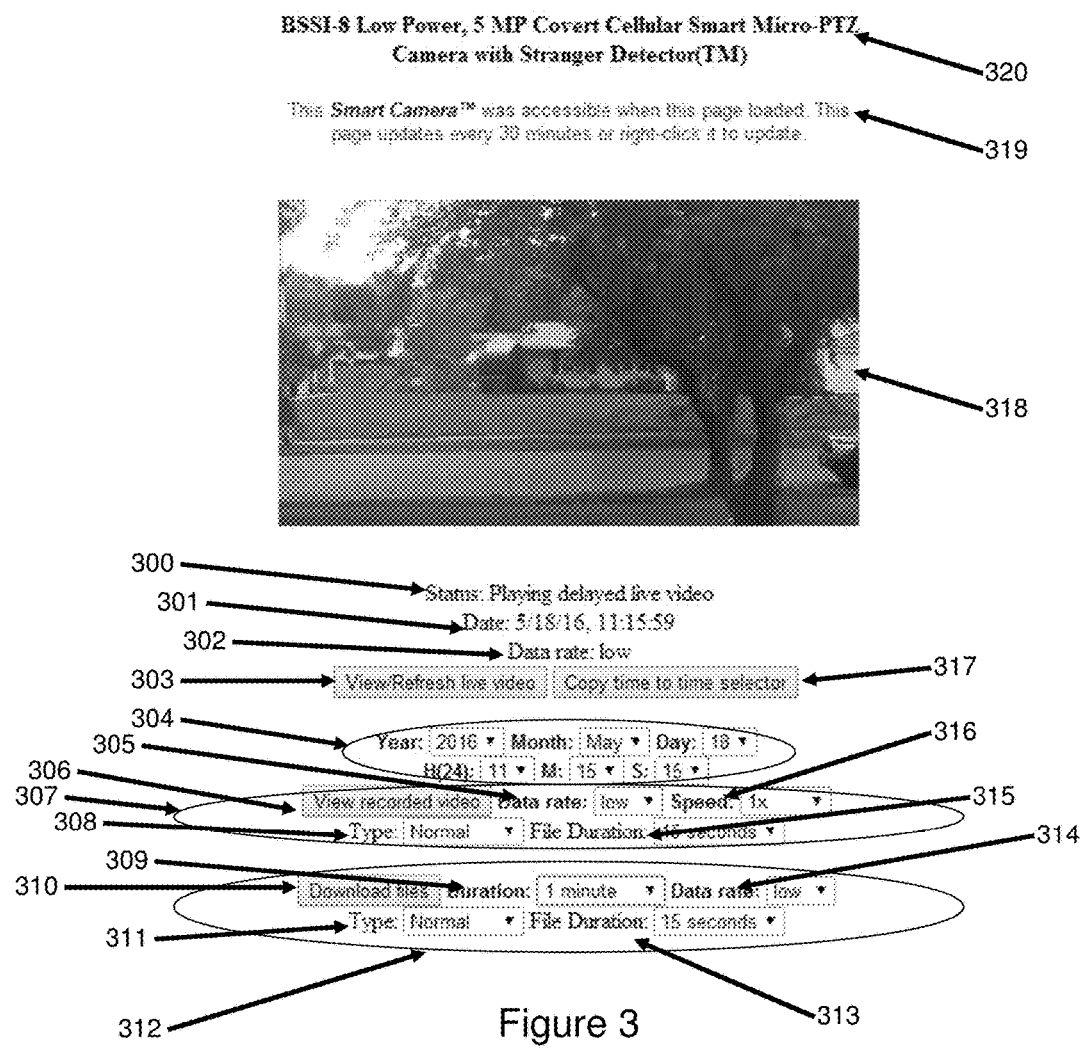
FIG. 3 shows a viewing page with Integrated Time-Lapse capability, displaying live video and ready for a user to download normal video files, according to this invention. Key elements in the page are identified.

FIG. 3 shows my expanded graphical user interface page that has Integrated Time-lapse Video Capability according to this invention. The elements, 301, 302, 303, 304, 305, 306, 317, 318, 319 and 320, have the same functions and values as the corresponding elements, 101, 102, 103, 104, 105, 106, 112, 113, 114 and 115, respectively, described previously.

Two controls, 308 and 315, have been added to the display selection group of controls, 307, to chose the content for the video window, 318. In this group, the Type selector, 308, enables one to choose Normal or Time-lapse to display, with Normal being the default. The File Duration selector, 315, is context sensitive based on Type, 308. It enables one to select the duration of each video file, 15 seconds being the only choice for Normal video files, as selected by Type, 308. Other values for File Duration, for Time-lapse, are hour, day and week. Values for the Speed selector, 316, are also context sensitive based on Type, 308, and File Duration, 315.

A second, like set of controls, 311 and 313, has been added to the download files group of controls, 312, to select the type and duration of video files for downloading as an archive. In this group, the Duration, 309, and File Duration, 313, controls are context-sensitive according to the Type field, 311, as described subsequently. The Type may be chosen as Normal, the default, or Time-lapse. The File Duration, 313, is context sensitive based on Type, 311. Then Type, 311, is Normal, the only choice for File Duration, 313, is 15 seconds. When Type, 311, is Time-lapse, the choices for File Duration, 313, are hour, day and week, or whichever are provided by a particular Smart Camera. Duration, 309, is context sensitive based on Type, 311, and File Duration, 309. When Type, 311, is Normal, the values for Duration, 313, are various numbers of minutes. When Type, 311, is Time-lapse and File Duration, 313, is hour, the values for Duration, 309, are various number of hours. When Type, 311, is Time-lapse and File Duration, 313, is day, the values for Duration, 309, are various numbers of days. When Type, 311, is Time-lapse and File Duration, 313, is week, the vales for Duration, 309, are various numbers of weeks.

The user interface software knows the structure of the file system on Smart Cameras and is able to read files from it. The name of each time-lapse file and normal file provides the information for the user interface to choose the file that starts at a desired date and time, i.e., contains images captured starting at a particular time. The file name also specifies the spatial resolution, low or high, of the file's video. The names of time-lapse files also include the file duration, which is reflected by the starting and ending times of the file, and the interval between snapshots used to create the particular time-lapse video. The interval between snapshots field enables the user interface to properly state the speed at which the particular file is viewed, and enables the Date field, 301, to properly advance from frame to frame. I say particular file because the parameters that govern the creation of the time-lapse files may change over time for a given Smart Camera, and the placement of these parameters in each file name enables each file to be handled properly.

The values of the Status field, 300, which describe the video display, 318, include (a) Loading, (b) Playing delayed live video, (c) File not found, (d) Playing recorded video, i.e., playing Normal recorded video, and (e) Playing time-lapse video.

Figure 4:
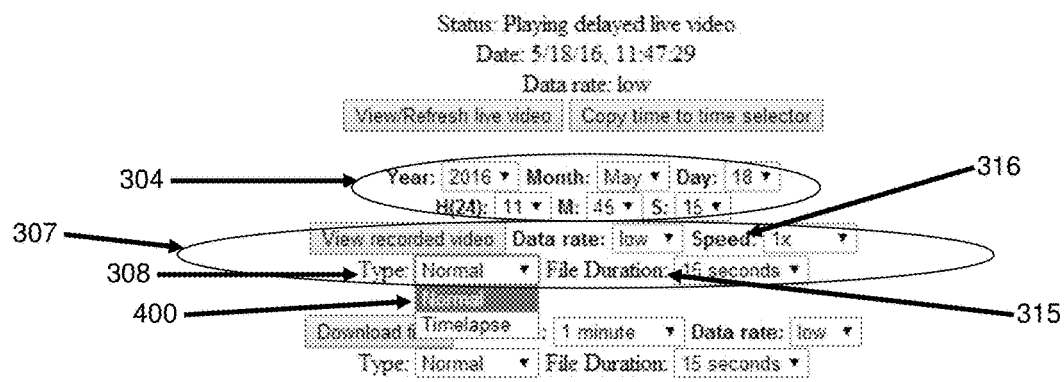
FIG. 4 shows a viewing page with Integrated Time-Lapse Capability, displaying live video, and showing the types of recorded video available for viewing on this page, according to this invention.

FIG. 4 shows the types of recorded video available for viewing on this page. In the display selector group of buttons, 307, the Type, 308, can be chosen as Normal or Time-lapse, using the drop down box, 400. Normal is chosen in this example, The type of file chosen by Type, 308, affects the contents of the Speed, 316, and File Duration, 315, selectors. The File Duration, 301, for Normal video is 15 seconds. The choices of File Duration for time-lapse video are one hour, one day, and one week.

Figure 5:
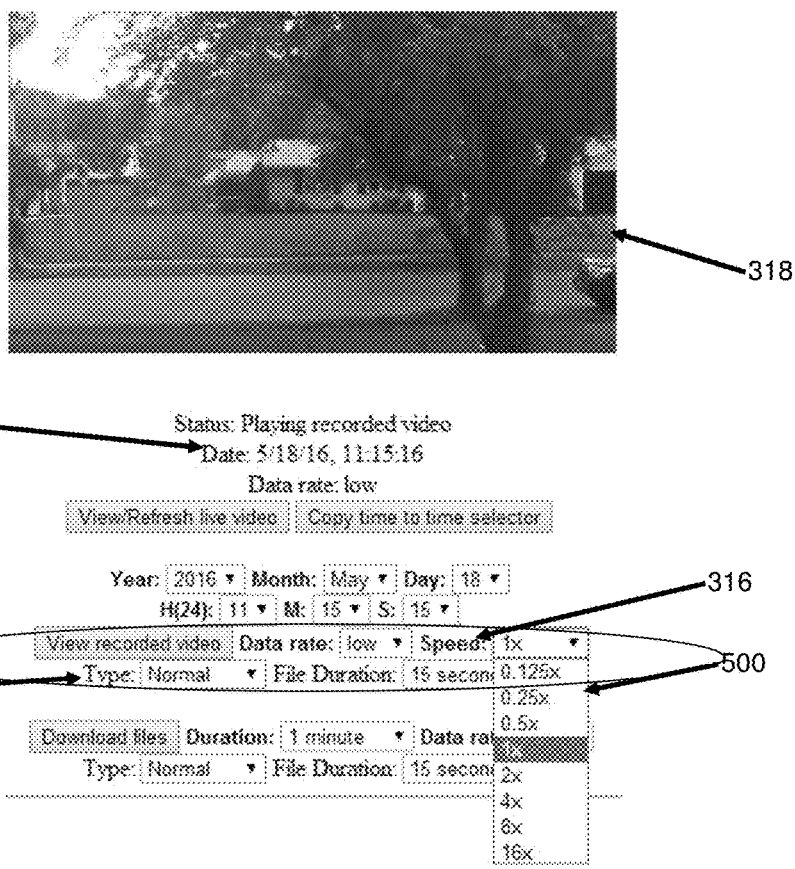
FIG. 5 shows a viewing page with Integrated Time-Lapse Capability, displaying normal recorded video, and showing the expanded Speed drop down box for normal video, according to this invention.

FIG. 5 shows Normal recorded video being displayed at 1× speed. The Speed drop down box, 316, is context-sensitive, based on the Type, 308, of video being viewed, Normal in this case. The figure shows the choices of display speeds, 500, that are appropriate for Normal recorded video, with 1×, the default, being selected.

With Normal recorded video, often only the low data rate stream can be displayed in this page continually at 1× or somewhat higher speed via a 3G cell network due to limitations of the network. Display of the high data rate stream in daylight, when accessed over a 3G cellular network, would likely start and stop as it is fetched due to limitations of the network. Once the user selects a starting time and clicks View recorded video, recorded video is downloaded and displayed continuously starting from the selected time stamp, with possible pauses between files due to downloading and buffering delays. The date and time shown at Date, 301, beneath the video window, 318, are updated as the video is displayed.

Figure 6:
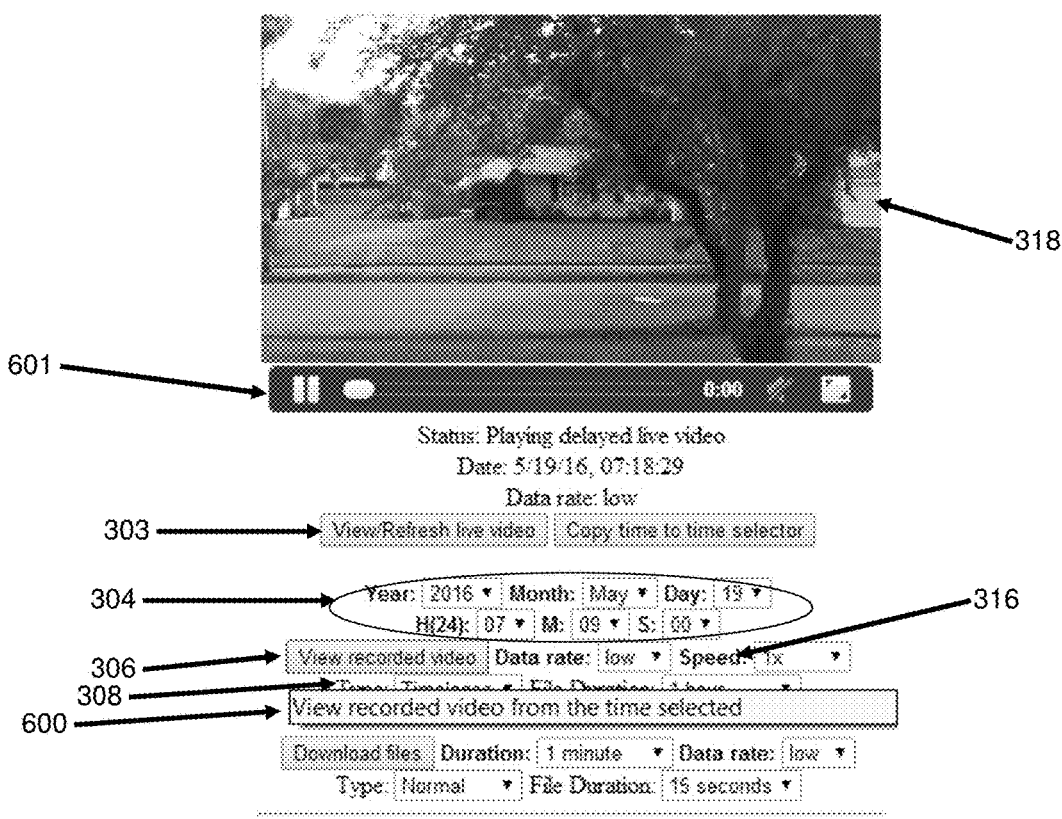
FIG. 6 shows a viewing page with Integrated Time-Lapse Capability, displaying live video, showing mouse-over for the View recorded video button, and video controls beneath the video window, according to this invention.

FIG. 6 shows a text box, 600, that appears when the user moves a mouse over the View recorded video button, 306. All buttons have pop-up text boxes to describe the function provided by the button so little or no written documentation is required. Delayed live video is displayed by default when the page is opened. Recorded video is displayed when the View recorded video button, 306, is clicked. The Type of recorded video, Normal or time-lapse, displayed is chosen by the Type selector, 308. The default type of recorded video for viewing is Normal. The date and time when the page is opened or refreshed is automatically placed in the time selector, 304. Since the time at a computer used for viewing may differ from the time at a Smart Camera, either slightly, due to small differences in time synchronization, or significantly, due to the user and Smart Camera being in different time zones, the time initially shown in the time selector, 304, is read from the Smart Camera. When recorded video is being displayed, the video display reverts to Delayed live video when the user clicks the View/Refresh live video button, 303. The video controller, 601, appears when one hovers a mouse over the video window, 318. It enables one to pause and resume video playback, and choose the frame to view within a file. It is not aware of wall clock time and indicates the time of the frame being displayed only with respect to the frames in the video file being displayed.

Figure 7:
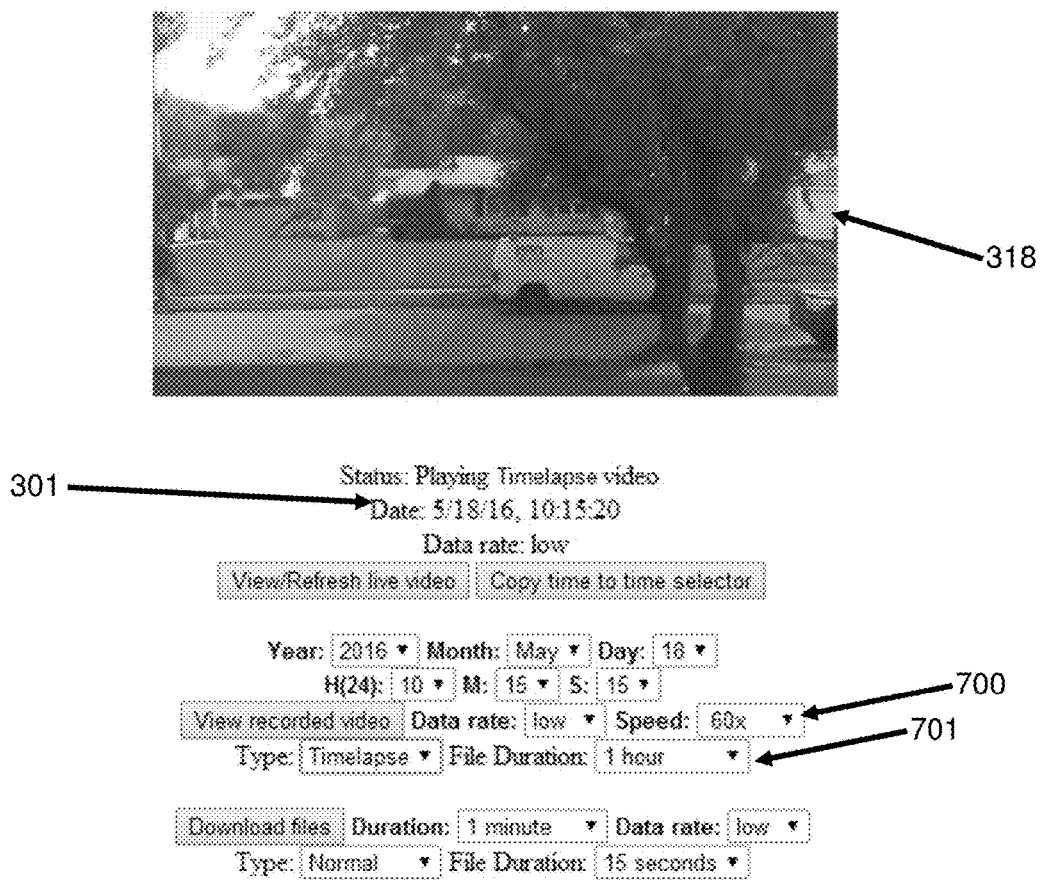
FIG. 7 shows a viewing page with Integrated Time-Lapse Capability, displaying time-lapse hour files at 60× wall clock speed, according to this invention.

FIG. 7 shows the display of time-lapse video having a File Duration, 701, of one-hour, being displayed at a Speed, 700, of 60 times wall clock speed, shown as 60×. Thus a time-lapse video whose images were captured by the Smart Camera over a period of one hour, i.e., a time-lapse hour file, and displayed in the video window, 318, at 60× is displayed in one minute, regardless of the interval between successive snapshots used to make the time-lapse video. The time stamp, 301, of the frame displayed updates as the video is displayed, and gives the wall clock times of the frames. This is essential for integration with normal recorded video.

I always reference the Speed, 700, to wall clock speed to avoid any confusion when viewing time-lapse video. I do this because a time-lapse video, in the absence of any frame rate information, loses its reference to real time. When I say I am playing a one-hour time-lapse video, I mean the images were captured over one hour, not how long it takes to view them. If images were captured 15 seconds apart over an hour, for a total of 240 images, to form a time-lapse video file that I call an hour file, it is common for media players, such as VLC Media Player, at 1× speed, to display that video at the standard motion picture frame rate of frames per second. This gives an apparent video length of only 240/25=9.6 seconds, which is reported at the right, 902 (see FIG. 9), of the video controls, 601 (see FIG. 6), beneath the video window, 317. Playback of the video shown is just starting, hence a time of 0:00 is shown. If the video were at its end, a time of 0:09 would be shown.

I include the beginning and ending dates and times from which video was captured to make each time-lapse video file in the name of the file. I also include the interval between snapshots used to make the time-lapse video file in the name of each time-lapse file. My viewing software uses this information to control the media player that displays video in the video window, 318, in the web page so the user can choose a playback speed using the Speed, 316, control that is always based on the wall clock speed of the original images, and to facilitate integration of time-lapse video with normal recorded video. The duration of time-lapse files indicated by the video controller, 601, is irrelevant.

Figure 8:
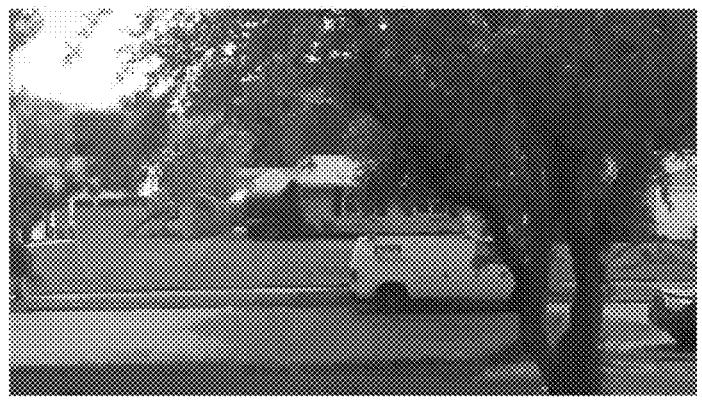
FIG. 8 shows a viewing page with Integrated Time-Lapse Capability, displaying time-lapse hour files at 960× wall clock speed, and the expanded Speed drop down box for time-lapse hour files, according to this invention.

FIG. 8 shows the display of time-lapse video having a File Duration, 315, of one-hour, being displayed at very high speed, at 960×, as selected using the drop down box, 800. Playback speeds appropriate for the type of time-lapse video chosen by File Duration, 315, are shown in the Speed drop down box, 316. Values for the drop down box are chosen as follows: viewing an hour time-lapse video at 60× wall clock speed takes 1 minute, viewing at 120× takes ½ minute, and viewing at 960× takes ¹⁄₁₆ minute, not including the time to fetch the file from the Smart Camera. I instruct the video player in the web page to display each frame for the requisite amount of time to achieve the selected playback speed based on the type of file selected.

Figure 9:
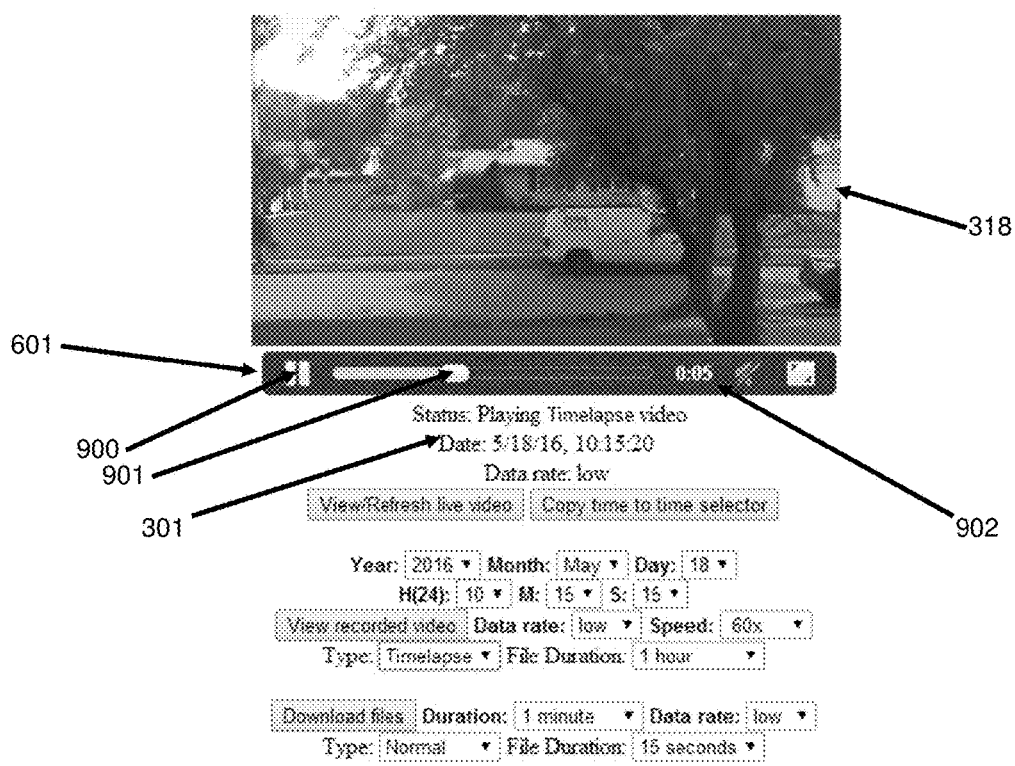
FIG. 9 shows a viewing page with Integrated Time-Lapse Capability, displaying time-lapse hour files, and showing video controls under the video window, according to this invention.

FIG. 9 shows the video controls, 601, that are on screen when recorded video is displayed on a PC and the mouse is hovered over the video window, 318, or more often when recorded video is displayed on a mobile device. The video controls enable video display to be paused or resumed using its Play/Pause button, 900. The position of the slider, 901, and value of time, 902, shown in the video controls, 601, are elapsed time within the video file based on a 25 Hz motion picture frame rate assumed by most video players in the absence of any other timing information, not based on the wall clock time when the video frames was captured. However, the date and time shown by Date, 301, give the wall clock time when the video frame being displayed was captured. Date, time and interval information in the name of the video file, and counting frames within the video file, enables me to provide this information, as explained earlier.

Figure 10:
FIG. 10 shows a viewing page with Integrated Time-Lapse Video Capability, showing the expanded, File Duration drop down box for time-lapse video files, according to this invention.

FIG. 10 shows the File Duration choices, 1000, 1 hour (selected), 1 day and 1 week, for on-screen viewing of time-lapse video. These durations are set by the three scheduling programs, timelapse_scheduler_hour.sh, timelapse_scheduler_day.sh, and timelapse_scheduler_week.sh, respectively, described earlier herein. The number of different durations and periods between snapshots available on a given Smart Camera depend on the processor speed in the Smart Camera, as described earlier.

Figure 11:
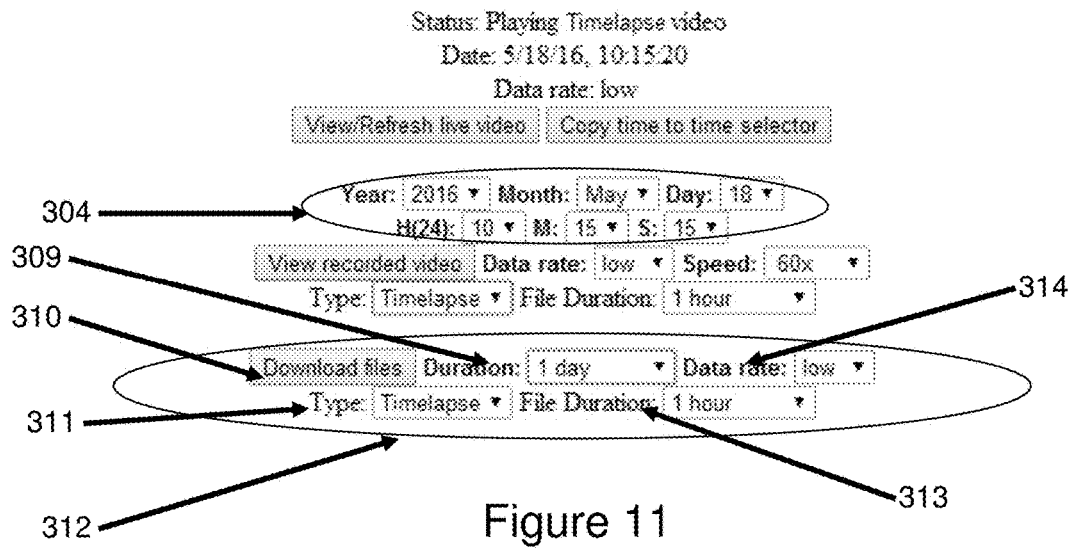
FIG. 11 shows a viewing page with Integrated Time-Lapse Capability, ready for a user to download one day of time-lapse hour files and place them in an archive, according to this invention.

FIG. 11 shows how to download a Duration, 309, of one day's worth of low data rate, time-lapse hour files. The user first chooses the starting date and time using the time selector, 304. The minutes and seconds fields do not matter for any time-lapse video since the shortest one has an hour duration and starts at 0 minutes and 0 seconds. The hour field does not matter for day and week files since they start at 0 hours, 0 minutes and 0 seconds.

The user then sets the Type selector, 311, to Timelapse so other context-sensitive buttons in the Download files section, 312, of the page change accordingly. The user then sets the File Duration selector, 313, to 1 hour, to choose time-lapse hour files. Finally, the user sets the Duration selector, 309, to, for example, 1 day, the Data rate selector, 314, to, for example, low, provided low-rate time-lapse hour files are available in the chosen Smart Camera, and then clicks the Download files button, 310. The selected files are downloaded from the Smart Camera and placed, without any further compression, into a zip file archive that is placed in the download files folder chosen by the user's browser.

Blocks of recorded video can be downloaded while video is being displayed. An Internet connection to a Smart Camera would be shared by these multiple uses.

Figure 12:
FIG. 12 shows a viewing page with Integrated Time-Lapse Capability, ready for a user to download one week of time-lapse day files and place them in an archive, according to this invention.
Figure 12:
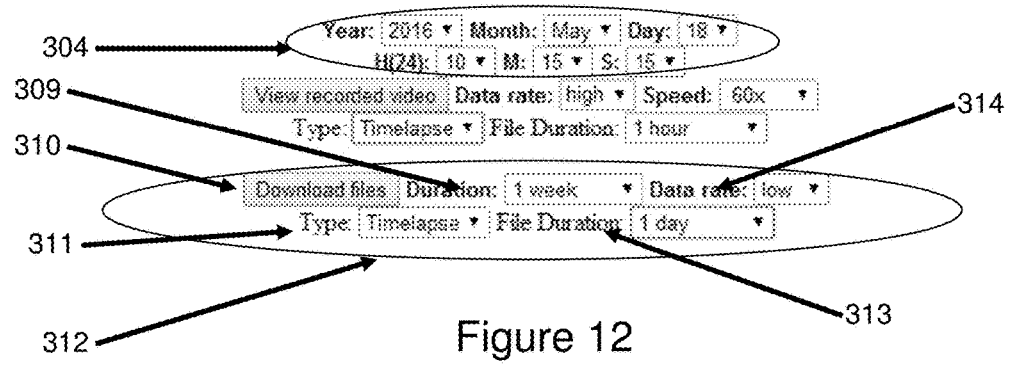

FIG. 12 shows how to download one week's worth of low data rate, time-lapse day files. The user first chooses the starting date and time using the time selector, 304, as described above. The user then sets the Type selector, 311, to Timelapse so other context-sensitive buttons in the Download files section, 312, of the page change. The user then sets the File Duration selector, 313, to 1 day to choose time-lapse day files. Finally, the user sets the Duration selector, 309, to 1 week, the Data rate dropdown, 314, to low, and then clicks the Download files button, 310. The selected files are downloaded from the Smart Camera and placed, without any further compression, into a zip file archive that is placed in the download files folder in the user's browser.

I claim:

1. A method for reducing the amount of time and data required for a person to review recorded surveillance video, comprising:
   (a) a communications network;
   (b) at least one surveillance camera that captures an endless series of images and produces at least one video stream from those images;
   (c) a first processor, able to communicate via the communications network;
   (d) a first mass storage device accessible by the first processor and able to store at least programs;
   (e) a second mass storage device accessible by the first processor and able to store at least images;
   (f) a video acquisition program stored on the first mass storage device, executed by the first processor and able to convert at least one video stream from at least one surveillance camera into a series of normal video files, each normal video file having at least one image and normal video files containing multiple images contain images from successive points in time spanning a period of time, and successive normal video files have images from successive, non-overlapping periods of time, where the video acquisition program stores the normal video files with unique names on the second mass storage device;
   (g) a video processing program stored on the first mass storage device and executed periodically by the first processor, where each execution of the video processing program extracts a series of images from one or more normal video files, where the extracted images are from successive, uniformly spaced points in time, and converts each series of images into a time-lapse video file, which it stores with a unique name on the second mass storage device, producing an endless series of time-lapse video files covering successive, non-overlapping periods of time;
   (h) normal video files and time-lapse video files have information for determining a time-of-creation timestamp for their every frame, said time-of-creation timestamp being the date and time that a frame was captured by a surveillance camera;
   (i) a web site containing a web site mass storage device and a web page processor, said web page processor being able to communicate via the communications network, said web site mass storage device storing codes for web pages;
   (j) a web page for providing a graphical user interface, display video, select and display the speed at which the video is displayed, and derive, manipulate and display the time-of-creation timestamp for each video frame displayed, said web page being composed by the web page processor using a web page code; and
   (k) a web page display device, able to communicate via the communications network, and able to access, manipulate and display information from the second mass storage device and the web page;
   where a person viewing the web page on the web page display device can playback video from a time-lapse video file and pause playback, where the web page determines, manipulates and displays the time-of-creation time stamp for each video frame it displays, and, upon command of the person viewing the web page, displays video from a normal video file that was used to create said time-lapse video and contains a frame having the time-of-creation time stamp of the time-lapse video frame being displayed, where the web page displays video from the normal video file from the time-of-creation time stamp of the time-lapse video frame being displayed.

2. A method as described in claim 1, where the person is replaced by a machine and a graphical display device is replaced by digital images in the memory of the machine, for automated, high speed analysis of time-lapse video files and normal video files.

3. A method as described in claim 1, where for each surveillance camera, the first processor is within the surveillance camera and produces the at least one video stream that is produced by the camera, and stores the normal video files for the at least one video stream on a second mass storage device within the camera.

4. A method as described in claim 3, where each normal video file has sufficiently short duration that the image obtained to create a time-lapse video is the first frame of the normal video file.

5. A method as described in claim 1, where additionally:
a) the surveillance camera captures images and simultaneously produces at least two video streams, one video stream, the lesser quality video stream, having images that are less sharp than images in the second video stream, the higher quality video stream;
b) the video acquisition program obtains and converts images from the lesser quality video stream into a series of lesser quality normal video files and converts images from the higher quality video stream into a series of higher quality normal video files; and
c) the video processing program converts images from the lesser quality normal video files into a series of uniquely named, time-lapse video files;
where a person can view video from the lesser quality time-lapse video files at high speed via the user interface and instruct said user interface to display video from a lesser quality normal recorded video file or a higher quality normal video file, at lower speed, from the date and time of the timestamp obtained when playback of the time-lapse video file is paused.

6. A method as described in claim 5, where the video processing program creates a uniquely named, time-lapse video file only from images captured during the previous hour, forming a continuous series of hourly time-lapse video files.

7. A method as described in claim 6, where the video processing program creates a time-lapse video file from images captured 15 seconds apart.

8. A method as described in claim 6, where a person can view video from a series of lesser quality time-lapse video files at high speed and instruct the user interface to display video from a lesser quality normal recorded video file or a higher quality normal video file at lower speed, from the date and time of the timestamp obtained when playback of the lesser quality time-lapse video file is paused.

9. A method as described in claim 1, where additionally the video processing program creates at least two sets of uniquely named, time-lapse video files, the two sets of time-lapse video files containing images captured over the same time period, but with different sets of time-lapse video files having different durations and different amounts of time between successive images.

10. A method as described in claim 9 where each time-lapse video file in one set of time-lapse video files has images captured 15 seconds apart and these images were captured over a period of one hour, and each time-lapse video file in the other set of time-lapse video files has images captured 60 seconds apart and these images were captured over a period of one day.

11. A method as described in claim 1, where additionally, the user interface allows the user to select the speeds at which normal recorded video and time-lapse recorded video are displayed, where the speed is given in terms of the speed with which images were captured by the surveillance camera for the particular video file being displayed.

12. A method as described in claim 1 where the time period over which images captured by a surveillance camera are placed in each normal video file by the video acquisition program is 15 seconds.

13. A method as described in claim 1, where additionally:
a) the surveillance camera captures images and simultaneously produces at least two video streams, one video stream, the lesser quality video stream, having images that are less frequent than images in the second video stream, the higher quality video stream;
b) the video acquisition program converts each image from the lesser quality video stream into a uniquely named image file containing that single image, and converts images from the higher quality video stream into higher quality normal video files; and
c) the video processing program converts images from a series of image files, each image file containing a single image, into lesser quality time-lapse video files;
where a person can view video from the lesser quality time-lapse video files at high speed via the user interface and instruct said user interface to display video from a higher quality normal video file at lower speed, from the date and time of the timestamp obtained from the lesser quality time-lapse video file when playback of the lesser quality time-lapse video file is paused.

14. A method as described in claim 1, where additionally:
a) the surveillance camera captures images and simultaneously produces at least two video streams from the same images, one video stream, the lesser quality video stream, having images that are less frequent than images in the second video stream, the higher quality video stream;
b) the video acquisition program obtains and converts images from the lesser quality video stream into a series of lesser quality normal video files and converts images from the higher quality video stream into a series of higher quality normal video files; and
c) the video processing program converts images from one series of normal video files into a series of time-lapse video files;
where a person can view video from the lesser quality time-lapse video files at high speed via the user interface and instruct said user interface to display video from a higher quality normal video file at lower speed, from the date and time of the timestamp obtained from the lesser quality time-lapse video file when playback of the lesser quality time-lapse video file is paused.

15. A method as described in claim 1, where the second mass storage device is a portion of the first mass storage device.

16. A method as described in claim 1, where additionally, the user can view a time-lapse video file via the user interface, pause playback, view one or more normal video files starting from the timestamp of the paused time-lapse video file, and then resume viewing the time-lapse video file at the timestamp when it was paused.

17. A method as described in claim 9, where a person can view video from the time-lapse video files having the longer amount of time between successive images, via the user interface, pause playback, and view the time-lapse video files having the shorter amount of time between successive images, starting from the date and time of the timestamp obtained from the time-lapse video file having the longer amount of time between successive images, when its playback was paused.

18. A method as described in claim 1, where the functions of the web site are provided within the surveillance camera.

* * * * *